(12) United States Patent
Smith et al.

(10) Patent No.: US 6,276,394 B1
(45) Date of Patent: Aug. 21, 2001

(54) COMPACT STEM SET WITH LOAD-BALANCED ROLLERS FOR NON-LUBRICATED DOUBLE BLOCK AND BLEED PLUG VALVES

(75) Inventors: Gordon M. Smith, Brookshire; Kevin W. Lilie, Columbus, both of TX (US)

(73) Assignee: General Valve, Inc., Brookshire, TX (US)

( * ) Notice: Subject to any disclaimer, the term of this patent is extended or adjusted under 35 U.S.C. 154(b) by 0 days.

(21) Appl. No.: 09/613,739

(22) Filed: Jul. 11, 2000

(51) Int. Cl.[7] ................................................. F16K 37/00
(52) U.S. Cl. ........................ 137/556; 251/56; 137/556; 74/424.8 VA
(58) Field of Search ............................... 137/556; 251/56, 251/252; 74/424.8 VA

(56) References Cited

U.S. PATENT DOCUMENTS

| 3,046,802 | * | 7/1962 | Cupedo | 251/252 |
| 4,195,816 | * | 4/1980 | Thompson et al. | 251/229 |
| 4,234,157 | * | 11/1980 | Hodgeman et al. | 251/56 |
| 4,235,258 | * | 11/1980 | Uno | 137/556 |
| 4,350,322 | * | 9/1982 | Mueller | 251/229 |

FOREIGN PATENT DOCUMENTS

| 468270 | * | 8/1946 | (CA) | 251/252 |

* cited by examiner

Primary Examiner—A. Michael Chambers
(74) Attorney, Agent, or Firm—Leonard Tachner

(57) ABSTRACT

In the stem set configuration for a double block and bleed plug valve, the improvement provides an operator which can be significantly shorter and more compact than conventional operators for such valves. The invention makes use of a novel nesting of the threading section whereby a conventional female thread is replaced by a nested male thread surrounded by the translation section. The translation section, in turn, houses the indication section inboard of the nested male threads thereby compacting three functions into one location. This design lends itself nicely to investment casting technology obviating conventional machine shop practices. The invention also combines by use of a long plug stem pin, the plug connection and L slot functions into one location. The input function still remains separate, however, combining ultimately all functions in only three discrete locations and what appears at this time to be the ultimate compacted or nested arrangement.

12 Claims, 10 Drawing Sheets ized as follows: It is more compact than previous designs;
COMPACT STEM SET WITH LOAD-BALANCED ROLLERS FOR NON-LUBRICATED DOUBLE BLOCK AND BLEED PLUG VALVES

BACKGROUND OF THE INVENTION

1. Field of the Invention

The present invention relates generally to the field of plug valves and more particularly to the field of non-lubricated double block and bleed plug valves.

2. Background Art

The Twin Seal double block and bleed plug valve uses a "retract before turning to open motion" which displays both ¼ turn rotary and linear movement with multi-turn input. This is presently accomplished by valve operators comprising a two piece stem set which when properly coordinated with the housing, will produce linear travel when the outer stem and housing are locked with the roller preventing rotary motion and allowing only linear motion while the input rotates. Similarly, at the extreme top of the motion of the outer stem, the roller is allowed to move inwardly (radially) locking the inner and outer stem together for only rotary motion (¼ turn only).

There are presently six basic functions being performed in these operators.

1) INPUT—rotary handwheel or motor input—provides turn force;
2) "L" SLOT—prevents operator from overtravel/undertravel/premature travel/improper travel;
3) TRANSLATION—forces rotary or linear travel;
4) THREADS—provides linear force;
5) INDICATOR—provides visual indication of plug position at the top of the operator;
6) PLUG CONNECTION—connects the operator to the plug.

Such prior art deploys these six functions in numerous discrete locations as can be seen in patented prior art designs. Attempts were made in the prior art to "compact" the stem sets by combining the input and threaded sections. Also a rotary translation device was implemented to assist in minimizing stem length, but this device only allowed for one revolution of the stem (¼ for turn ¾ for lift) which limited use to high-pitched stems. Also the stem doubled as the indicator shaft. This reduced the six functions to four discrete locations.

The problem with stem sets having numerous discrete and separate locations for accomplishing the listed six functions, is length. Long operators are inherently more susceptible to damage, less convenient for positioning valves in tight spaces, susceptible to instability and warpage and not conducive to casting with higher strength materials. Moreover, fabrication tends to be more labor intensive thus contributing to a higher price valve.

It would be highly advantageous if it were possible to provide a stem set configuration which significantly reduced the length of the valve operator.

SUMMARY OF THE INVENTION

The present invention provides a radical improvement in the stem set configuration for a double block and bleed plug valve. The improvement provides an operator which can be significantly shorter and more compact than conventional operators for such valves.

The invention makes use of a novel nesting of the threading section whereby a conventional female thread is replaced by a nested male thread surrounded by the translation section. The translation section, in turn, houses the indication section inboard of the nested male threads thereby compacting three functions into one location. This design lends itself nicely to investment casting technology obviating conventional machine shop practices. The invention also combines by use of a long plug stem pin, the plug connection and L slot functions into one location. The input function still remains separate, however, combining ultimately all functions in only three discrete locations and what appears at this time to be the ultimate compacted or nested arrangement.

By turning the handwheel, the input shaft of the inner stem is rotated in accordance with the direction of the handwheel whose torque is transmitted via a key. This input shaft is allowed by virtue of its collar and the housing and retainer plate, rotary motion only (no linear motion).

When roller apertures are in rotary alignment with the roller tracks and the input shaft rotates, by virtue of its male threads it causes the output shaft to travel linearly up and down (handwheel rotates cw down, ccw up). When the roller apertures are in rotary and vertical alignment with the inner stem recesses, the input shaft and outer stem rotate as one unit by virtue of the three rollers "locking" the shafts together.

At the transition of linear to rotary motion, the rollers move from the housing track/outer stem to the outer stem/inner stem. The rollers are configured so that only one position can be supported at the exact corner of the L-slot. However, the rollers require guidance which is the function of the L slot pin.

The advantages of the present invention may be summarized as follows: It is more compact than previous designs; it fits in tighter spots; it allows for more room on walkways and for maintenance; the compact design allows for high strength materials of construction which, in turn, allow the operator to be directly driven without gears and their associated bulk and costs; the compact design reduces weight and mass. High strength materials allow a smaller operator to work at more demanding loads; the compact design and improved harder cast materials extend operator life; the compact design and improved harder cast materials allow for maintenance free operation (w/perm lube); the compact size allows for investment cast technology since warpage/stability is not an issue as in large and especially longer castings; the high strength, high wear resistant, thermally stable material preferably used in the invention needs compact designs to be practical; the compact dimensions allow for extra pull off without adding length.

Another significant feature of the present invention resides in the novel use of at least three symmetrically located rollers in the stem set assembly. Three rollers at 120 degree intervals provide a balanced force arrangement which reduces wear and increases reliability.

OBJECTS OF THE INVENTION

It is therefore a principal object of the present invention to provide a more compact operator apparatus for use with double block and bleed plug valves.

It is another object of the invention to provide a foreshortened stem set for a plug valve operator by employing a nested male thread in a translatable outer stem for receiving a rotatable inner stem.

It is yet another object of the invention to provide a plug valve operator apparatus which is designed to be sufficiently compact in length to permit manufacture by casting of extremely hard materials to virtual net shape.

It is still another object of the invention to provide a balanced force, symmetrical roller assembly in a stem set operator for a double block and bleed plug valve.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Figure 1:
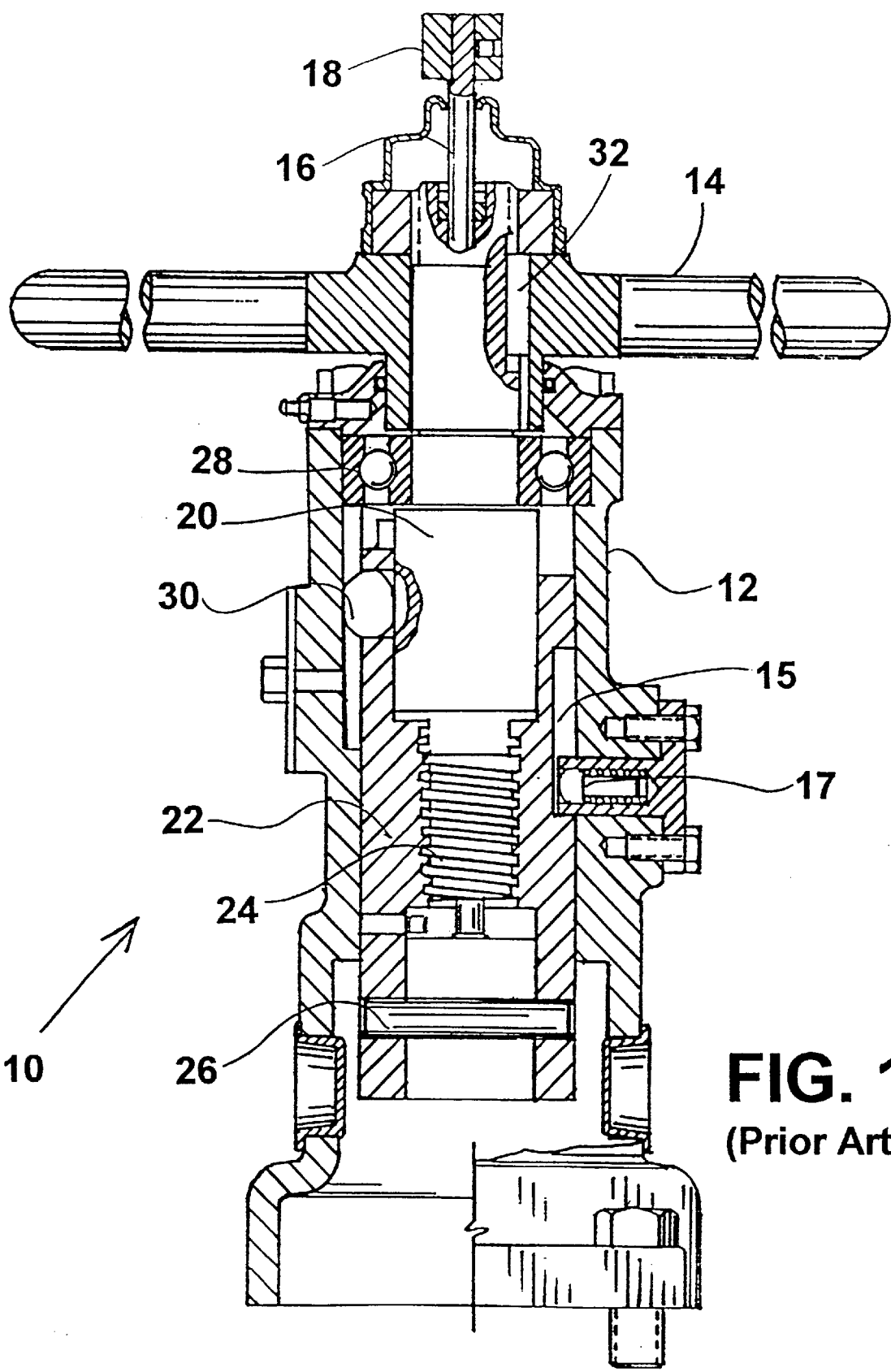
FIG. 1 is a partially cross-sectioned view of a typical prior art plug valve operator apparatus.
Figure 2:
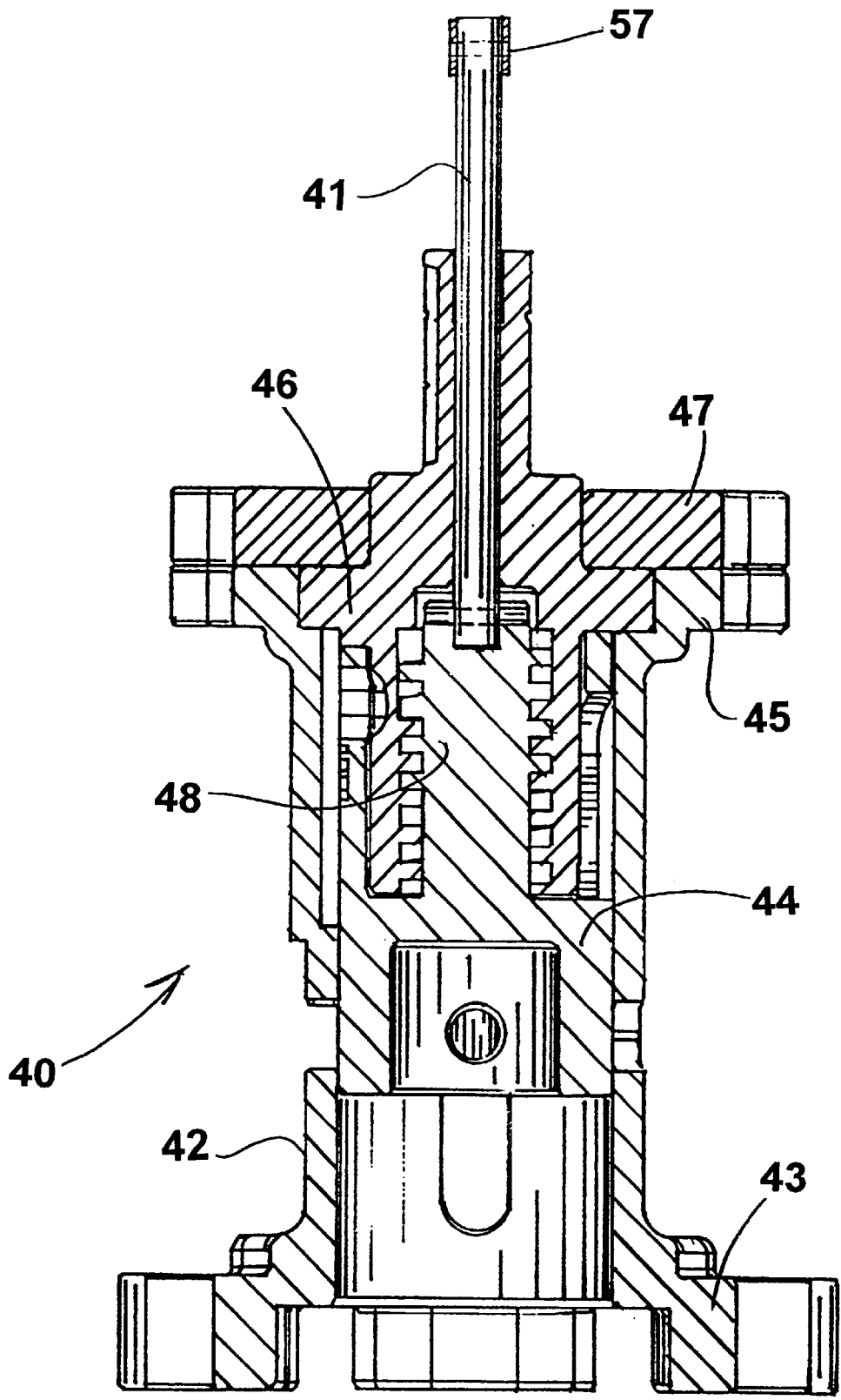
FIG. 2 is a partially cross-sectioned view of a preferred embodiment of the invention.
Figure 3:
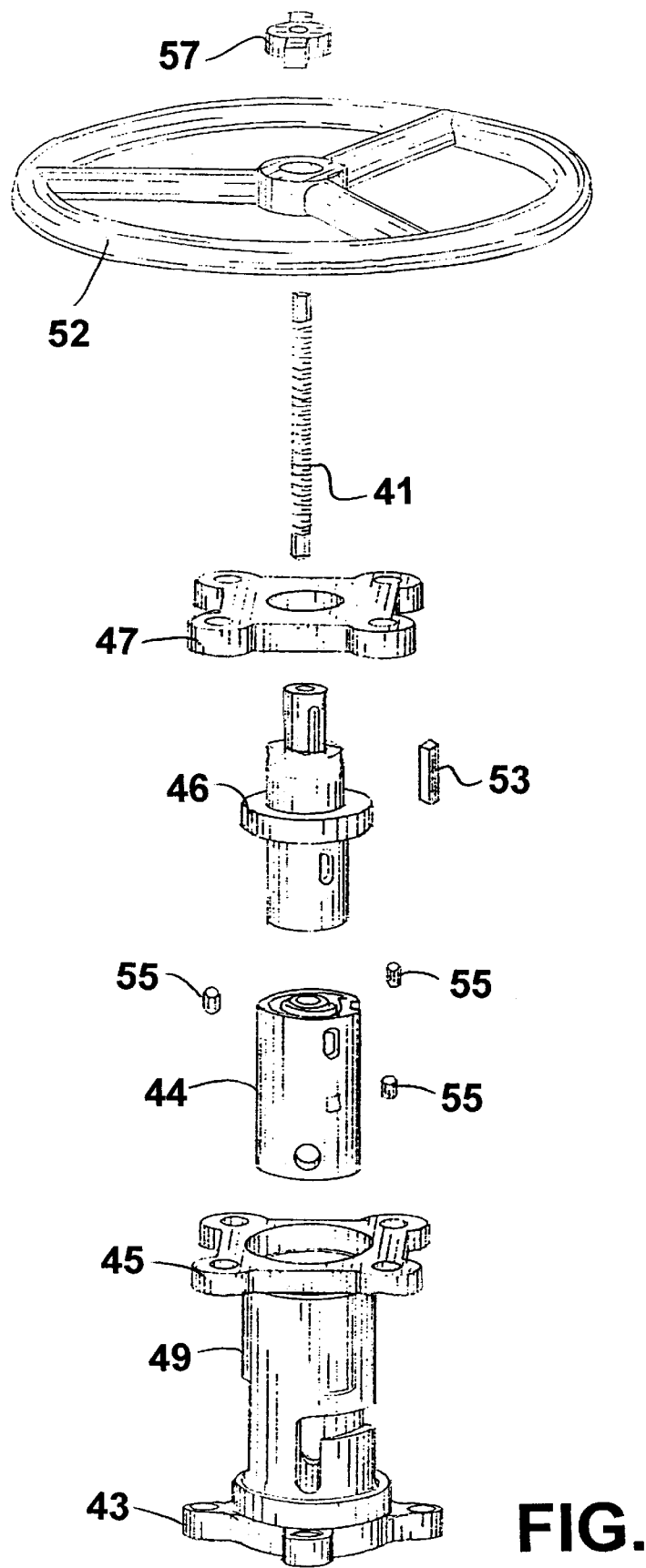
FIG. 3 is an exploded view of the preferred embodiment.
Figure 4:
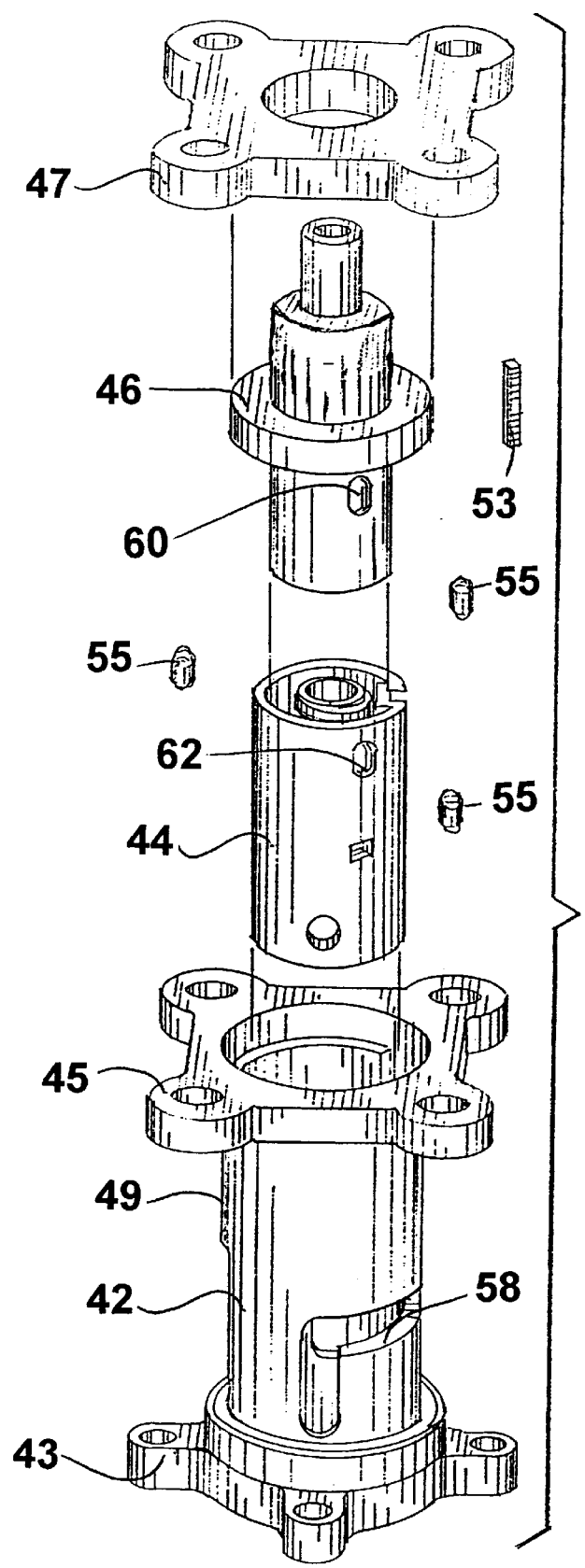
FIG. 4 is an enlarged exploded view of the stem set of the preferred embodiment.
Figure 5:
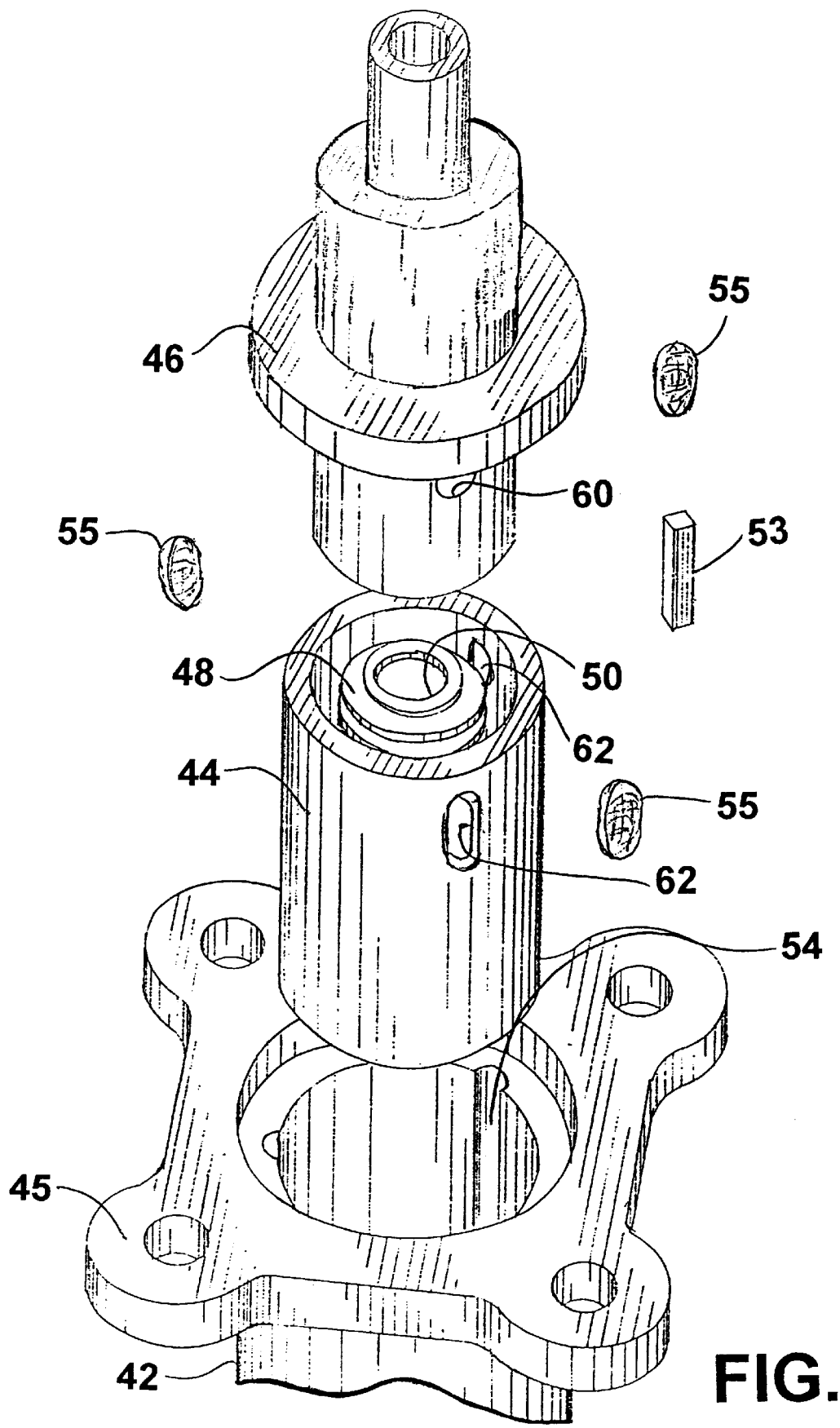
FIG. 5 is a still further enlarged view of the inner and outer stems.
Figure 6:
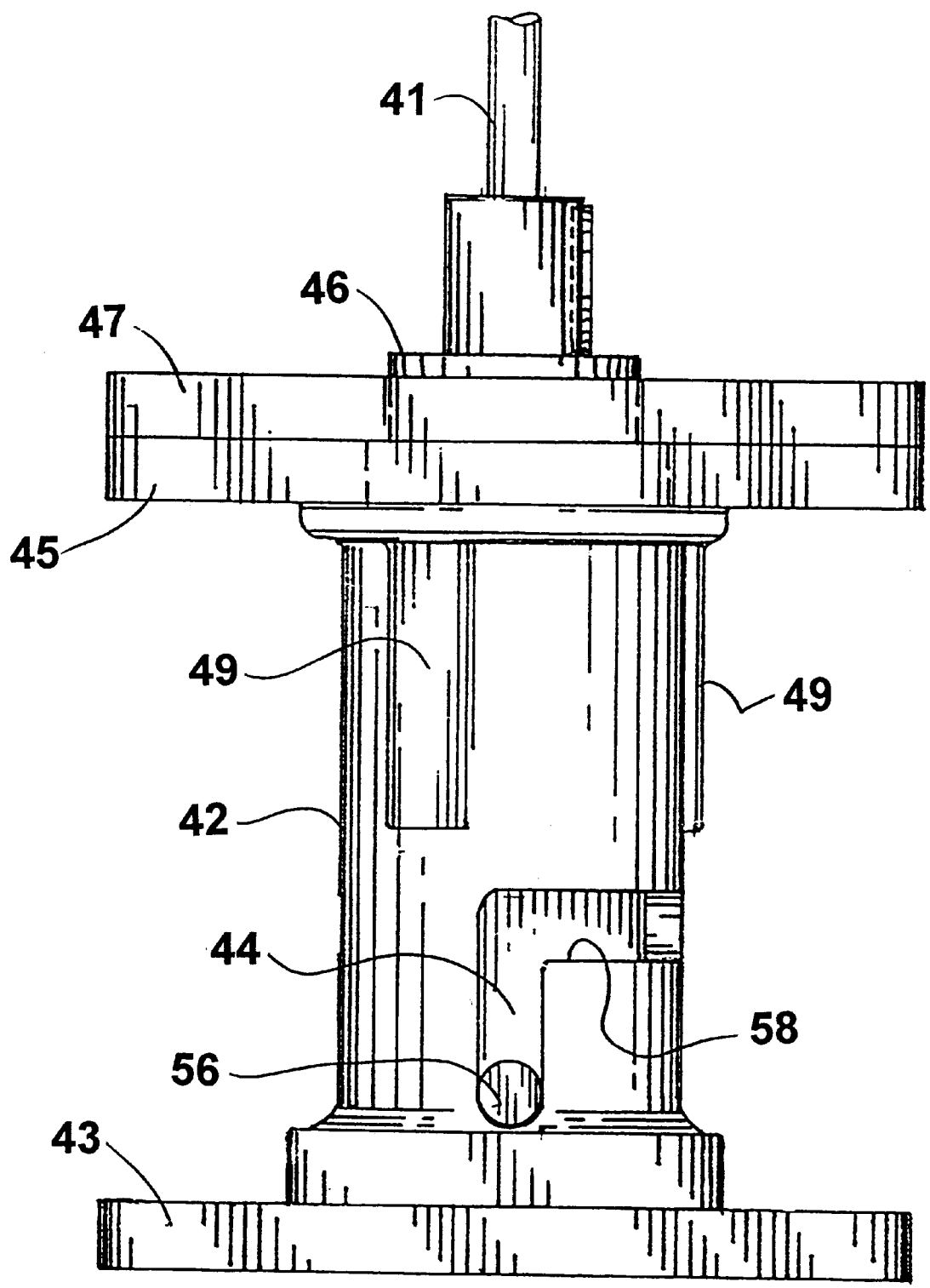
FIG. 6 is an elevational view of the preferred embodiment.

FIG. 1 illustrates a prior art valve operator 10 having a housing 12, a handwheel 14, an indicator shaft 16 and an indicator 18. Handwheel 14 is connected through a bearing 28 to an upper stem 20, the latter having a threaded section 24. Threaded section 24 engages and selectively locks upper stem 20 and lower stem 22 for rotary motion of a trunnion pin 26. An L-slot 15 into which a spring-loaded pin 17 projects, assures appropriate sequences of linear and rotary motion of the trunnion pin 26 to control the position and orientation of a plug (not shown). A key aspect of the prior art operator 10, which is typical of all conventional plug valve operators, is its overall length. The long length of conventional operators results from a design wherein all distinct functions (i.e., input, translation, L-slot control, threaded engagement, indication and connection to plug) are provided in separate, distinct levels.

The present invention provides a significantly shorter plug valve operator by combining distinct functions into common levels. This compacting of the operator is achieved in the preferred embodiment by employing a unique relationship between stems referred to as upper and lower stems in the prior art, but referred to as inner and outer stems in the present invention. Moreover, by combining the connection function (trunnion pin) and L-slot in the same level as both stems, a uniquely compact operator having numerous functions at a unitary level along the length of the operator, is achieved. This unique compactness will be better understood hereinafter as a result of the following description of a preferred embodiment in conjunctions with FIGS. 2–12.

It will be seen that the inventive operator 40 in accordance with a preferred embodiment, comprises a housing 42, an outer stem 44 and an inner stem 46. Outer stem 44 comprises a nested interior cylinder 50, the radial exterior of which provides an indicator shaft 41 which extends upwardly through a handwheel 52 and connects to an indicator 57. Inner stem 46 engages the handwheel by means of a key 53.

Housing 42 has a lower flange 43 and an upper flange 45, the latter being secured to a cover flange 47 which prevents inner stem 46 from axial travel during operation of the operator 40. Housing 42 also has two L-shaped slots 58 on opposite radial surfaces and through which there is positioned a stem pin 56. Housing 42 also comprises three symmetrically spaced axially directed grooves 54 which form exterior ridges 49 along the radial surface of the housing. It will be seen hereinafter that grooves 54 facilitate linear travel of the outer stem 44 by permitting three corresponding rollers 55 to travel axially along the interior surface of the housing. Rollers 55 also operate in conjunction with three corresponding recesses 60 in inner stem 46 and with three corresponding apertures 62 in outer stem 44.

Figure 7:
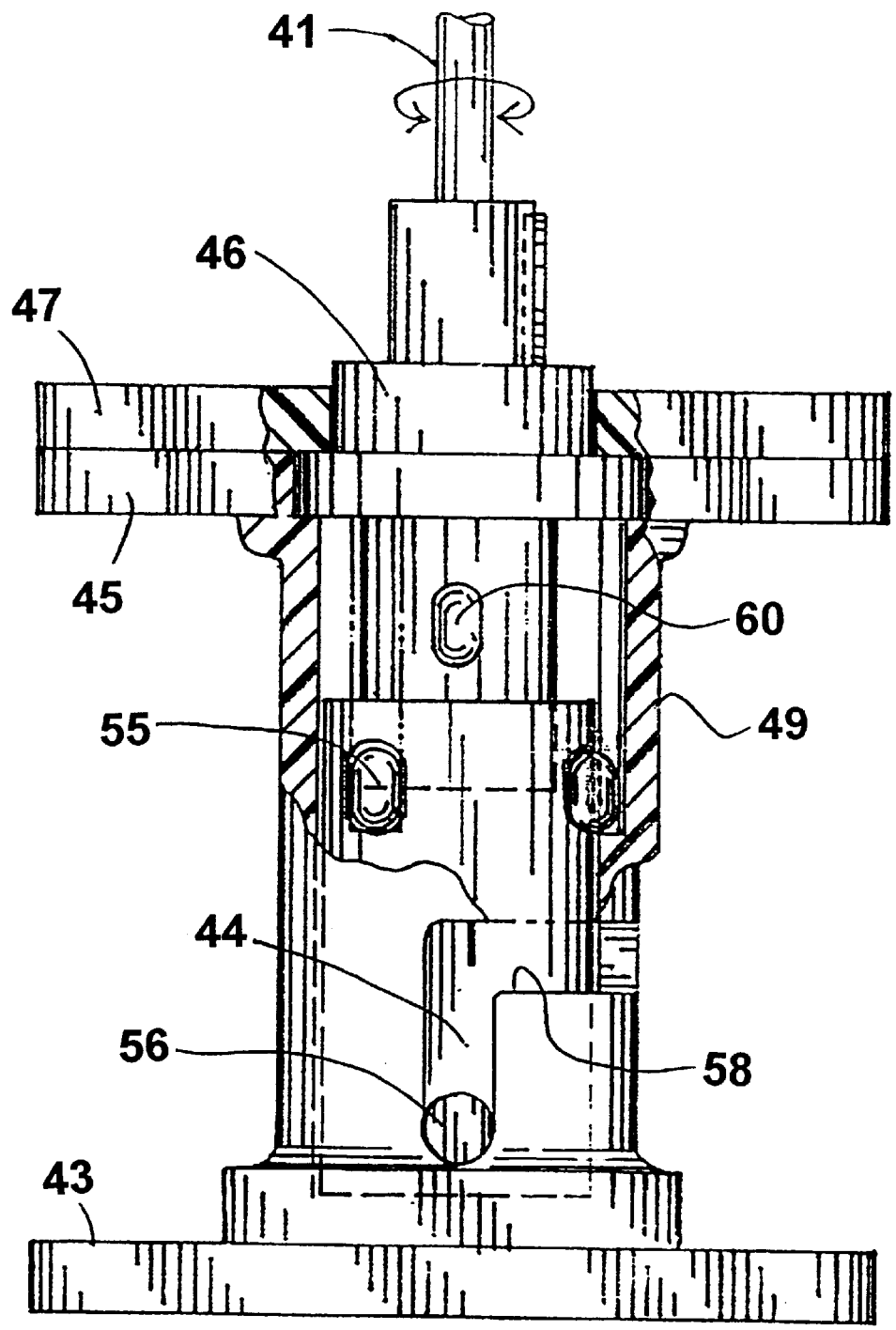
FIG. 7 is a partially cut-away view of the invention shown in the bottom-located stem pin configuration.
Figure 8:
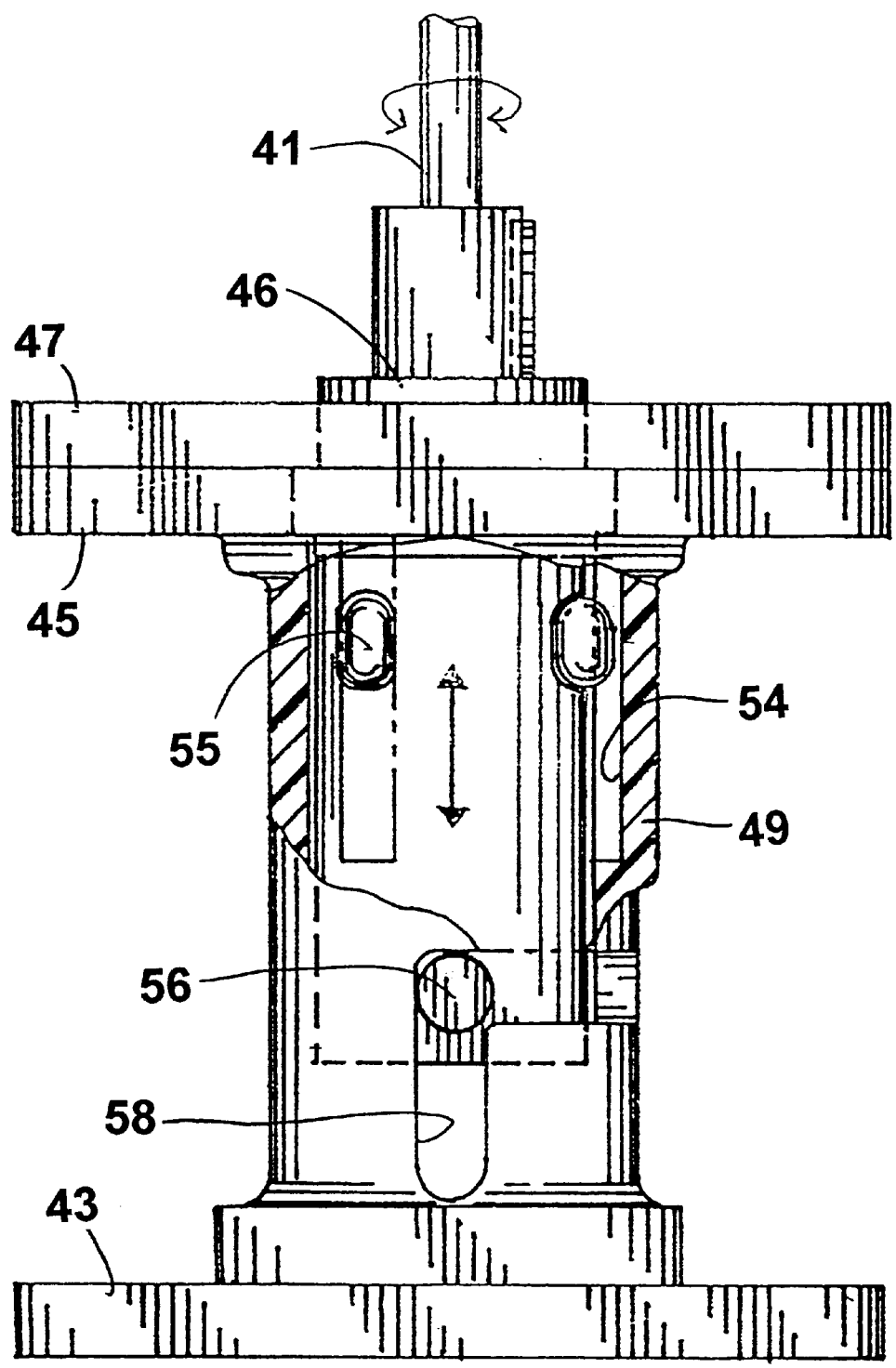
FIG. 8 is a view similar to FIG. 7 but showing the top-located stem pin configuration.
Figure 9:
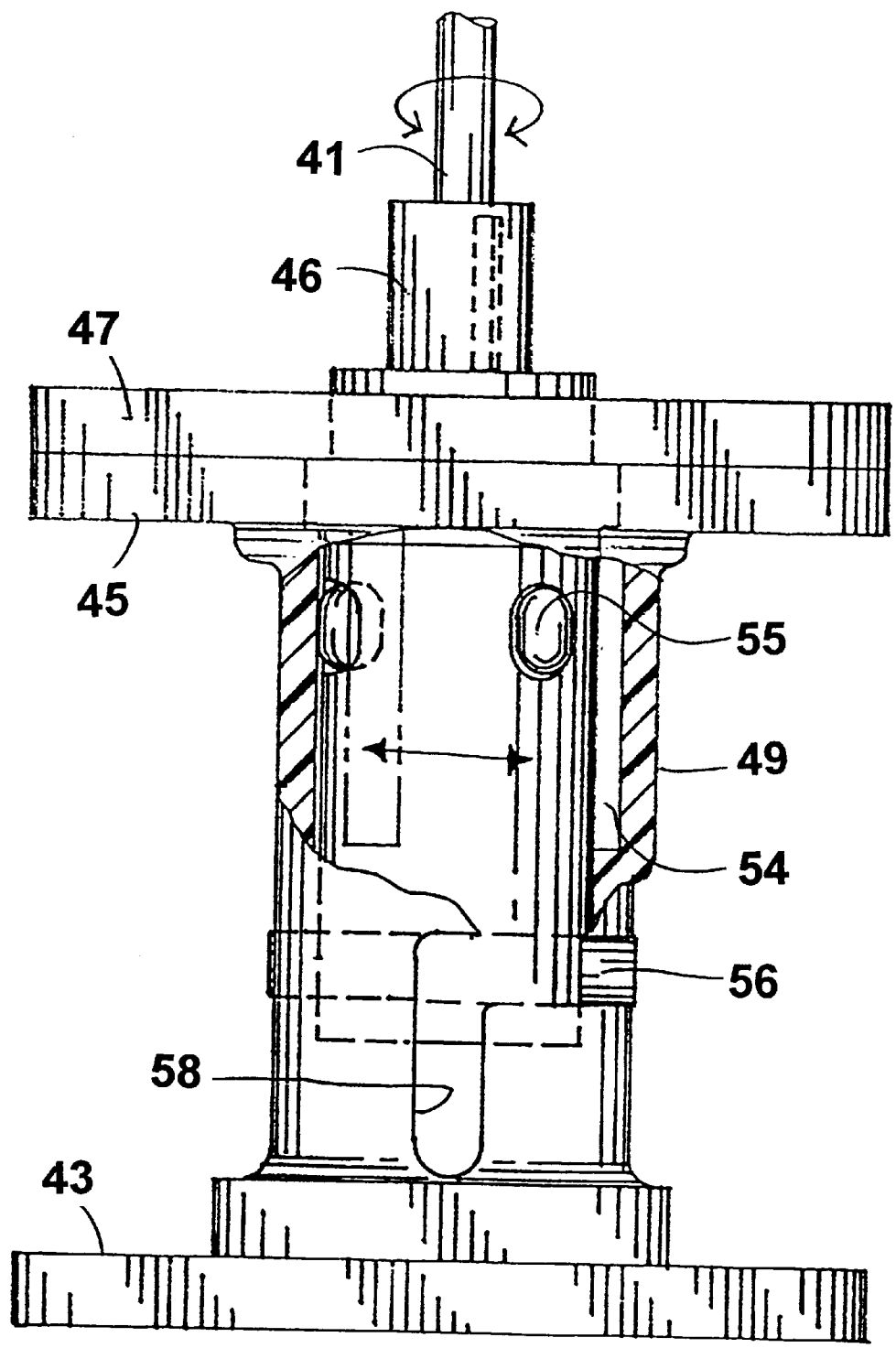
FIG. 9 is a view similar to FIG. 8 but showing the rotated stem pin configuration.
Figure 10:
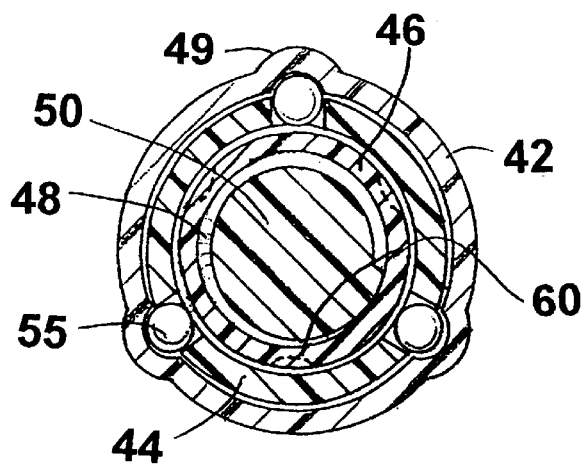
FIG. 10 is a cross-sectional, downwardly directed view showing the relationship of stems and rollers in the configuration of FIG. 7.

The operation of the operator 40 for converting rotation of handwheel 52 into sequential linear and quarter-turn motion of stem pin 56, may be best understood by reference to FIGS. 7 through 12 which illustrate stem roller and pin configurations at three discrete points. In FIGS. 7 and 10, the stem pin 56 is at its lowest point in L-slot 58, rollers 55 reside in apertures 62 and are at their lowest points of travel within grooves 54 and stems 44 and 46 are at full respective extension with stem 46 virtually unthreaded from threads 48 of nested cylinder 50.

Figure 11:
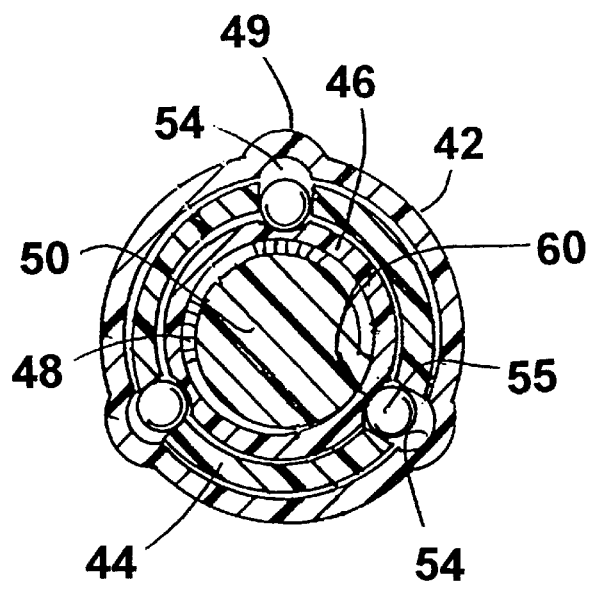
FIG. 11 is a view similar to FIG. 10, but in the configuration of FIG. 8.
Figure 12:
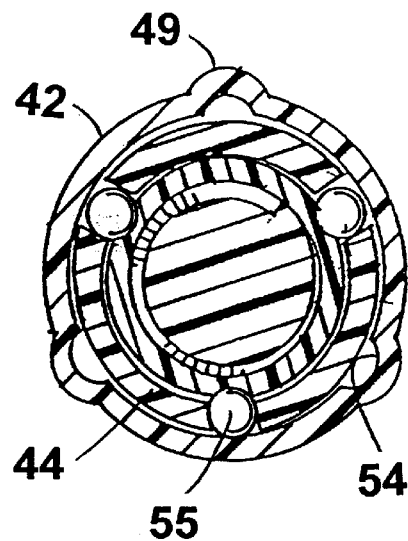
FIG. 12 is a view similar to FIGS. 10 and 11, but in the configuration of FIG. 9.

In FIGS. 8 and 11, the stem pin 56 is at its highest point in L-slot 58, rollers 55 have moved inwardly out of grooves 54 and into recesses 60, and stems 44 and 46 are fully threaded together. Because rollers 55 are no longer in grooves 54, both stems 44 and 46 can now rotate together within housing 42 upon continued rotation of the handwheel. Consequently, FIGS. 9 and 12 illustrate the stem pin 56 at its quarter-turn position with stems 44 and 46 turned ninety degrees so that the three symmetrical rollers 55 are displaced from grooves 54.

A significant aspect of the preferred embodiment is the use of three symmetrical rollers which centralize the load and thus balance destructive vectors that would otherwise heavily wear on roller and other stem bearing surfaces as is the case in conventional single and double roller configured operators.

Having thus disclosed a preferred embodiment of the present invention, it being understood that various modifications and additions are contemplated and will now be apparent to those having the benefit of the above description, what we claim is:

1. A plug valve operator for converting an input rotational motion to a sequential linear and quarter-turn motion; the operator comprising:

an outer stem member having an inner male threaded cylinder;

an inner stem member having a female threaded interior surface for engaging said male threaded cylinder so that rotation of said inner stem member causes translation of said outer stem member;

a hollow cylindrical housing having at least one L-shaped slot in a radial surface thereof and receiving said inner and outer stem members in concentric relation;

an elongated pin extended through said housing L-shaped slot and an aperture in said outer stem member; and means for causing limited translation of said pin and then a quarter-turn of said pin in response to turning of said inner stem member.

2. The operator recited in claim 1 wherein said causing means comprises a plurality of rollers retained in holes in said outer stem member and moveable radially for selectively requiring either said linear motion or said quarter-turn motion depending upon the extent and direction of turning of said inner stem member.

3. The plug valve operator recited in claim 2 wherein said inner stem member comprises a plurality of recesses for receiving said rollers for permitting said quarter-turn motion.

4. The plug valve operator recited in claim 1 wherein said housing comprises a plurality of axial roller grooves along its interior surface for guiding said rollers during said linear motion.

5. The plug valve operator recited in claim 1 further comprising an indicator for indicating the position of said pin and an indicator shaft connecting said indicator to said cylinder.

6. The plug valve operator recited in claim 1 further comprising an input torque member locked to said inner stem member for imparting a rotational torque to said inner stem members.

7. A plug valve operator for converting a rotary input motion to a sequential linear and quarter-turn motion of the valve plug; the operator comprising:

a hollow cylindrical housing having at least one L-shaped slot;

a pair of stem members concentrically contained within said housing for selective relative translation between said stem set members upon said input rotary motion;

three symmetrically positioned rollers in three corresponding apertures on one of said stem set members, the radial extent of said rollers determining whether said stem set members exhibit relative translation or simultaneous turning in accordance with said linear and quarter-turn motion.

8. A plug valve operator for converting a rotary input motion to a sequential linear and quarter-turn motion and controlling the position of a plug in a double block and bleed plug valve; the operator comprising:

a hollow cylindrical housing having a pair of symmetrically opposed L-shaped slots in the wall of said cylinder and an elongated pin for travel in said slots;

a pair of concentric stem members threadably nested one in the other for relative translation therebetween upon rotation of one said stem member relative to the other, a first of said stem members having a pair of holes for receiving said pin and having an internal nested cylinder having exterior male threads, the second of said stem members having an internal female thread for engaging said male threads; and a plurality of rollers positioned in corresponding apertures in said first of said stem members between the interior of said housing and the exterior of said second of said stem members for selectively imposing said linear motion and permitting said quarter-turn motion.

9. The plug valve operator recited in claim 8 wherein said second of said stem members has a plurality of recesses for receiving said rollers for permitting said quarter-turn motion.

10. The plug valve operator recited in claim 8 further comprising an indicator for indicating the position of said pin and an indicator shaft connecting said indicator to said nested cylinder.

11. The plug valve operator recited in claim 8 wherein said housing comprises a plurality of axial roller grooves along its interior surface for guiding said rollers during said linear motion.

12. The plug valve operator recited in claim 8 further comprising an input torque member locked to said second of said stem members for imparting a rotational torque to said second of said stem members.

* * * * *